United States Patent
Cherif (10) Patent No.: US 9,424,994 B2
(45) Date of Patent: Aug. 23, 2016

(54) TUNABLE INTERDIGITATED CAPACITOR

(71) Applicant: TDK Corporation, Tokyo (JP)

(72) Inventor: Bouchaib Cherif, Yorktown Heights, NY (US)

(73) Assignee: TDK Corporation, Tokyo (JP)

( * ) Notice: Subject to any disclaimer, the term of this patent is extended or adjusted under 35 U.S.C. 154(b) by 86 days.

(21) Appl. No.: 14/245,033

(22) Filed: Apr. 4, 2014

(65) Prior Publication Data

US 2015/0162135 A1 Jun. 11, 2015

Related U.S. Application Data

(63) Continuation-in-part of application No. 14/101,833, filed on Dec. 10, 2013.

(51) Int. Cl.
*H01G 5/16* (2006.01)
*H01G 5/14* (2006.01)
*H01G 5/18* (2006.01)

(52) U.S. Cl.
CPC .............. *H01G 5/16* (2013.01); *H01G 5/145* (2013.01); *H01G 5/14* (2013.01); *H01G 5/18* (2013.01)

(58) Field of Classification Search
None
See application file for complete search history.

(56) References Cited

U.S. PATENT DOCUMENTS

| | | | |
|---|---|---|---|
| 6,242,989 B1 | 6/2001 | Barber et al. | |
| 6,529,750 B1 | 3/2003 | Zhang et al. | |
| 6,792,299 B2 | 9/2004 | Ye | |
| 7,006,342 B2 | 2/2006 | Williams et al. | |
| 8,189,319 B2 | 5/2012 | Kawakubo et al. | |
| 8,237,519 B2 | 8/2012 | Achour | |
| 2002/0025595 A1 | 2/2002 | Xu et al. | |
| 2002/0074621 A1 | 6/2002 | Cheng et al. | |
| 2002/0075626 A1 | 6/2002 | Liu et al. | |
| 2002/0079743 A1 | 6/2002 | Ma et al. | |
| 2004/0036132 A1 | 2/2004 | de los Santos | |
| 2004/0150939 A1 | 8/2004 | Huff | |
| 2004/0173876 A1 | 9/2004 | Musalem et al. | |
| 2004/0190217 A1 | 9/2004 | Stokes | |
| 2004/0246654 A1* | 12/2004 | Williams | H01G 5/16 361/278 |
| 2005/0224916 A1 | 10/2005 | Musalem et al. | |
| 2006/0291134 A1 | 12/2006 | Plowman et al. | |
| 2006/0291135 A1 | 12/2006 | Musalem et al. | |
| 2007/0222462 A1 | 9/2007 | Gardner et al. | |
| 2008/0055815 A1 | 3/2008 | Rottenberg | |
| 2009/0002915 A1 | 1/2009 | Ayazi et al. | |
| 2009/0066299 A1 | 3/2009 | Suzuki | |
| 2009/0190284 A1 | 7/2009 | Konishi et al. | |
| 2009/0296308 A1 | 12/2009 | Kawakubo et al. | |
| 2010/0038753 A1 | 2/2010 | Ni | |
| 2010/0214716 A1* | 8/2010 | Liu | B81B 3/0072 361/290 |

(Continued)

OTHER PUBLICATIONS

Goldsmith et al., "RF MEMs Variable Capacitors for Tunable Filters," Raytheon Systems Corporation, Dallas, TX, revised Dec. 30, 1998, 1999 John Wiley & Sons, Inc., 13 pages.

Mohra et al., "Tunable bandpass filter based on capacitor-loaded metamaterial lines," Electronic Letteres Apr. 23, 2009, vol. 45, No. 9, 2 pages.

Saha et al., "Tunable Bandpass Filter using RF MEMs Capacitance and Transmission Line," Progress in Electromagnetics Research C, vol. 23, 233-247, 2011.

(Continued)

*Primary Examiner* — Dion R Ferguson
(74) *Attorney, Agent, or Firm* — Nixon Peabody LLP (57) ABSTRACT

A tunable capacitor implemented as interdigitated arrays of finger elements arranged so that the spacing between finger arrays may be adjusted. The design has a number of advantages including high capacitance for a given circuit area, small area for a given desired capacitance, mechanical stability, high self resonance frequency, and high quality factor.

13 Claims, 14 Drawing Sheets

(56) References Cited

U.S. PATENT DOCUMENTS

| | | | |
|---|---|---|---|
| 2011/0063042 A1* | 3/2011 | Mendolia | H01P 5/04 333/17.3 |
| 2012/0068672 A1 | 3/2012 | Suzuki | |
| 2012/0250130 A1 | 10/2012 | Naono | |
| 2013/0063857 A1 | 3/2013 | Kim et al. | |
| 2013/0135785 A1 | 5/2013 | Kim et al. | |
| 2013/0271805 A1 | 10/2013 | Konishi et al. | |
| 2015/0162886 A1 | 6/2015 | Cherif | |

OTHER PUBLICATIONS

Office Action in U.S. Appl. No. 14/101,833, mailed Oct. 2, 2015.
Office Action in U.S. Appl. No. 14/264,756, mailed Jan. 15, 2016.
Notice of Allowance in U.S. Appl. No. 14/101,833, mailed May 16, 2016.
Notice of Allowance in U.S. Appl. No. 14/264,756, mailed Jun. 7, 2016.

* cited by examiner

TUNABLE INTERDIGITATED CAPACITOR

CROSS-REFERENCE TO RELATED APPLICATIONS

This patent application is a continuation in part of U.S. patent application Ser. No. 14/101,833 filed Dec. 10, 2013 entitled "Piezo Controlled Variable Capacitor" and relates to co-pending U.S. patent application Ser. No. 14/218,281 filed Mar. 18, 2014 entitled "Tunable Filter Using Variable Impedance Transmission Lines", each of which are hereby incorporated by reference.

BACKGROUND

1. Technical Field

This patent application relates generally to tunable electronic circuit components, and more particularly to a variable capacitor implemented as a multi-finger tunable structure.

2. Background Information

A capacitor is a two-terminal, passive electrical component used to store energy in an electric field. Capacitors may take many different physical forms, but in general will contain at least two electrical conductors separated by a dielectric (insulator). When a potential difference (voltage) applied across the conductors, a static electric field develops across the dielectric, causing positive charge to collect on one conductor and negative charge on the other conductor. Energy is thereby stored in the resulting electrostatic field. A capacitor is most often characterized by a single constant value, the capacitance, which is the ratio of the electric charge on each conductor to the potential difference between them. Other parameters, such as quality factor (Q), frequency response, and/or linearity, are also important in selecting an appropriate capacitor design.

Capacitors are commonly used in many different types of alternating current (AC) circuits, and especially radio frequency (RF) circuits. Capacitors are combined with inductors and other components to implement filters, duplexers, resonators, tuners, and other functions in these circuits. Electronic devices such as smart phones, tablets, laptop computers, and the like are now typically expected to communicate using many different communication protocols that operate over a wide range of radio and microwave frequencies. At the same time these devices need to be a small and inexpensive as possible.

Micro-Electro-Mechanical Systems (MEMS) technologies have been used to implement capacitors and other electronic components for RF applications since the late 1970's.

SUMMARY

In specific arrangements described herein, an adjustable interdigitated capacitor includes a first terminal having a main conductive body with multiple fingers extending from the main body, and a second terminal including a second conductive body with multiple fingers extending from that second body. The fingers of the first and second terminal sections each arranged in an array such that each terminal includes multiple rows and columns of fingers. The array fingers are positioned to be interposed between one another when the two body portions are positioned adjacent one another. In a preferred embodiment, the fingers disposed on each body are arranged in a rectangular array, with the individual fingers in each array having a defined cross-sectional shape. The shape of each finger may be rectangular, trapezoidal, circular, or some other regular geometric shape. A dielectric insulator may be disposed on one or both of the finger arrays.

The capacitance of the interdigitated structure may be adjusted in a couple of ways. In a first approach, capacitance is varied by adjusting a relative spacing between the fingers of the first and second terminal sections. This movement between terminal sections may be obtained via piezoelectric actuator(s), with spring(s), mechanical lever(s), or in other ways. In other embodiments, the capacitance can be varied if the material used to implement one or more of the insulator(s) is sensitive to an applied voltage. In those embodiments, the capacitance can be altered by changing the voltage applied to the insulator(s).

The fingers of the two terminal sections are preferably arranged in a rectangular array having for example at least two rows of fingers disposed in alignment with one another. Spacing is provided between both the vertical and lateral side surfaces of the fingers of the respective terminals to further increase the capacitance available in a given physical space.

An improvement in tunable filters is now also possible with certain embodiments of the interdigitated capacitor. In one example, components of a tunable filter are implemented using transmission line sections to synthesize each element of a lumped element filter. For example, one or more fixed impedance capacitors and/or inductors of the filter may be implemented with corresponding transmission line sections. The transmission line sections are then coupled in a circuit according to the desired filter class and topology; the tunable interdigitated capacitor may then be used to implement one of the filter components, such as a shunt capacitor. The resulting filter is thus tunable by adjusting the capacitance of the interdigitated capacitor.

BRIEF DESCRIPTION OF THE DRAWINGS

The detailed description below refers to the accompanying drawings, of which.

DETAILED DESCRIPTION OF AN ILLUSTRATIVE EMBODIMENT

In preferred implementations herein, a variable impedance capacitor is implemented using an interdigitated capacitor structure having two main body portions with each body including an array of generally rectangular fingers. The two body portions are disposed such that the distance between them, or a relative permittivity of a dielectric material disposed between them, may be adjusted.

Figure 1:
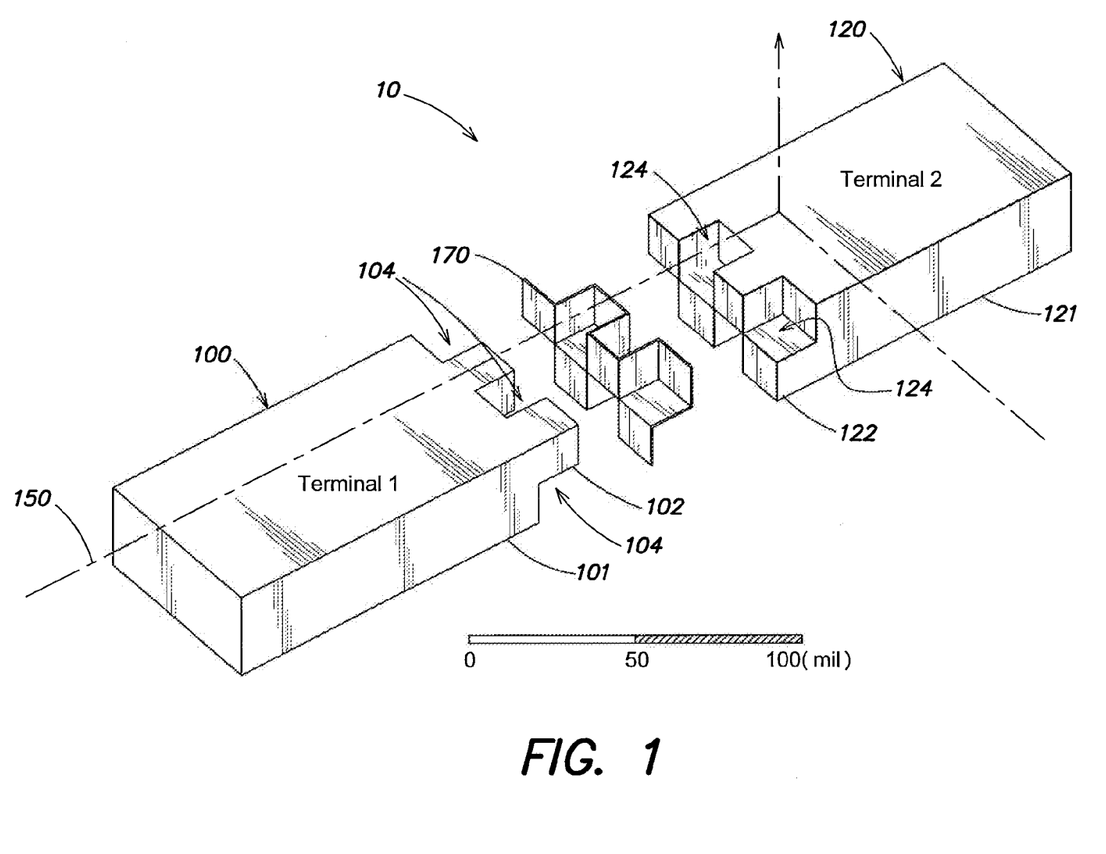
FIG. 1 is a three-dimensional view of an example structure of the interdigitated capacitor.

FIG. 1 illustrates one embodiment of an interdigitated variable capacitor 10 in more detail. A first terminal 100 consists of a main body section 101 and a number of fingers 102. Similarly a second terminal 120 consists of a main body portion 121 and a number of fingers 122. In this configuration, fingers 102, 122 are generally rectangular in cross-section and each finger extends a predetermined distance away from its respective body portion. However, other finger shapes are possible, as will be described below. The fingers 102, 122 are arranged on the facing end of each respective body 100, 120 in a two-dimensional, rectangular array such that there are at least two rows of fingers extending from the main body of each terminal.

The terminals 100, 120 and fingers 102, 122 are generally aligned with a coaxial offset from one another with respect to an axis 150. This is so that fingers 102 on the first terminal 100 may extend into resulting spaces 124 existing between the fingers 122 on the second terminal 120. Likewise, the fingers 122 on the second terminal 120 are aligned to extend into spaces 104 formed between the fingers 102 on the first terminal. Although the fingers of one terminal extend into spaces provided by the other terminal, the fingers of the two terminals should be maintained in a spaced apart relationship from one another so that they do not touch, which would otherwise create an electrical short.

In one embodiment, the overall capacitance of the interdigitated capacitor 10 is controlled by adjusting the spacing between the first terminal 100 and second terminal 120. Here, the spacing may be controlled by a piezo electric, micromechanical or other actuator. As will be explained more fully below, this spacing between terminals 100, 120 should be carefully controlled, as the total capacitance value will change depending on this spacing.

In one arrangement, there may be an insulating material 170 disposed between the terminals 100, 120. The view of FIG. 1 is an exploded view thus showing a dielectric insulating material 170 spaced away from both terminals 100, 120, but the assembled capacitor will have dielectric material disposed on one or both terminals 100, 120. The insulating material 170 serves to prevent the two terminals from touching each other, and also further serves to set the overall capacitance. The insulating material layer may be Teflon, or some ferroelectric material which provides adjustable permittivity as described in more detail below.

Figure 2:
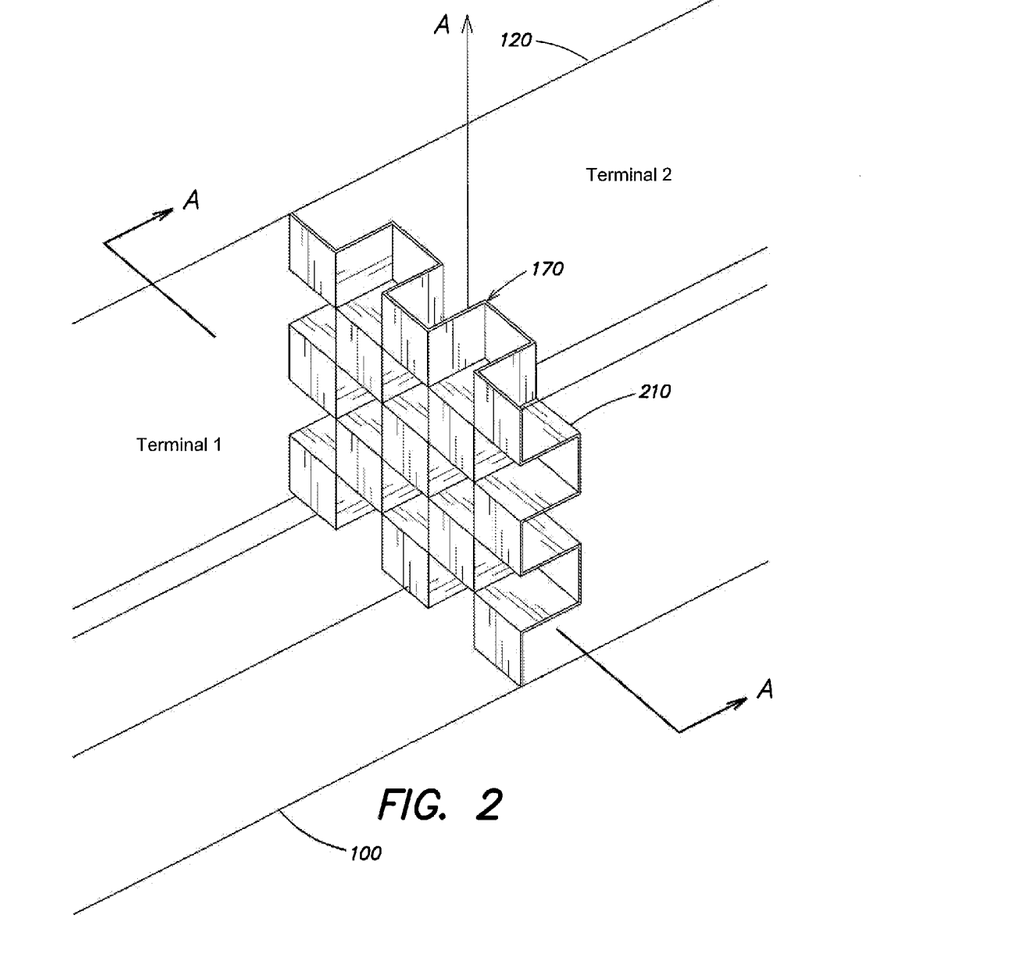
FIG. 2 is a more detailed view of an embodiment using fingers arranged in a 5×5 array in fully locked position.

FIG. 2 is a cut-away view of the assembled ("fully locked") shunt capacitor 10 showing the finger-arrays with a 0.1 mil insulating material 170 in more detail. There are five rows of fingers in this example, with five fingers in each row—three fingers in each row belonging to one terminal and the other two fingers belonging to the other terminal. The fingers in an example row 210 are alternately connected to the first terminal 100 and the second terminal 120. Spacing is maintained between fingers of terminal 100 and terminal 120 in both a horizontal and vertical direction. For example, a given finger in the finger array of terminal 100 is a uniform distance away from adjacent four (4) neighboring fingers extending from terminal 120. Similarly, a given finger in the finger array of terminal 120 is a uniform distance away from its adjacent four (4) neighboring fingers extending from terminal 100.

Capacitance is thus provided by the vertical gaps and horizontal spaces between a terminal and its nearest neighbors from the other terminal in the same row, and also by the gaps between a terminal and its neighbor from the other terminal in the row immediately above and below. Capacitance is thus provided in both the vertical and lateral direction. This increases the capacitive density for a given amount of space available to implement the capacitor 10, and also increases the self resonance frequency (SRF) and quality factor (Q).

While FIG. 1 and FIG. 2 illustrate an interdigitated capacitor 10 structure having fingers arranged in specific numbers of rows and columns, it should be understood that other numbers of rows and columns are possible to provide different ranges of capacitance. Also, changing the finger dimensions or the array spacing between the rows and columns will also alter the capacitance; spacing the surfaces of the fingers closer together will decrease the overall capacitance while separating the surfaces further apart will increase the overall capacitance.

As alluded to above, the presence of a dielectric layer 170 also affects the overall capacitance. It can be shown for example, that the overall capacitance is given by:

$$\text{Capacitance} = (\in_o {}^* \in_r {}^* A)/d$$

where $\in_o$ is the relative permittivity (dielectric constant) of adjacent free space (typically air), $\in_r$ is the relative permittivity of the material used to implement insulator 170, d is the separation between terminals 100, 120 and A is the "plate area" determined by the total overlapping surface area presented by the extending fingers 102, 122 and facing portions of the spaces formed in the ends of the two terminals.

Figure 3:
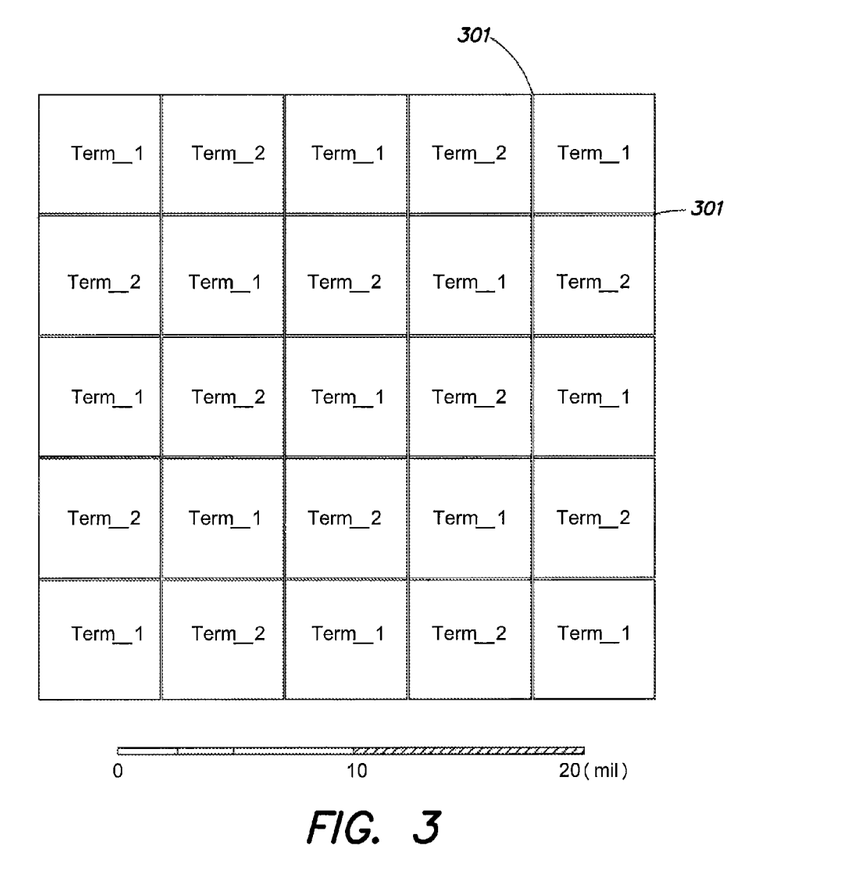
FIG. 3 is an end-on view of one of a first body section showing the faces of the fingers in the 5×5 array.

FIG. 3 is a cross section taken in plane A-A-A of FIG. 2 showing the arrangement of the 5×5 array of fingers. Each finger is labeled with the name of the terminal to which it belongs. Also shown is the relative scale of the array for a specific implementation, with the total array dimension being approximately 25×25 mils, with a space 301 of 0.1 mils maintained between rows and columns. It should be understood that although the spacing between rows and columns is shown to be uniform in this figure, that is not an essential aspect of all embodiments.

Figure 4:
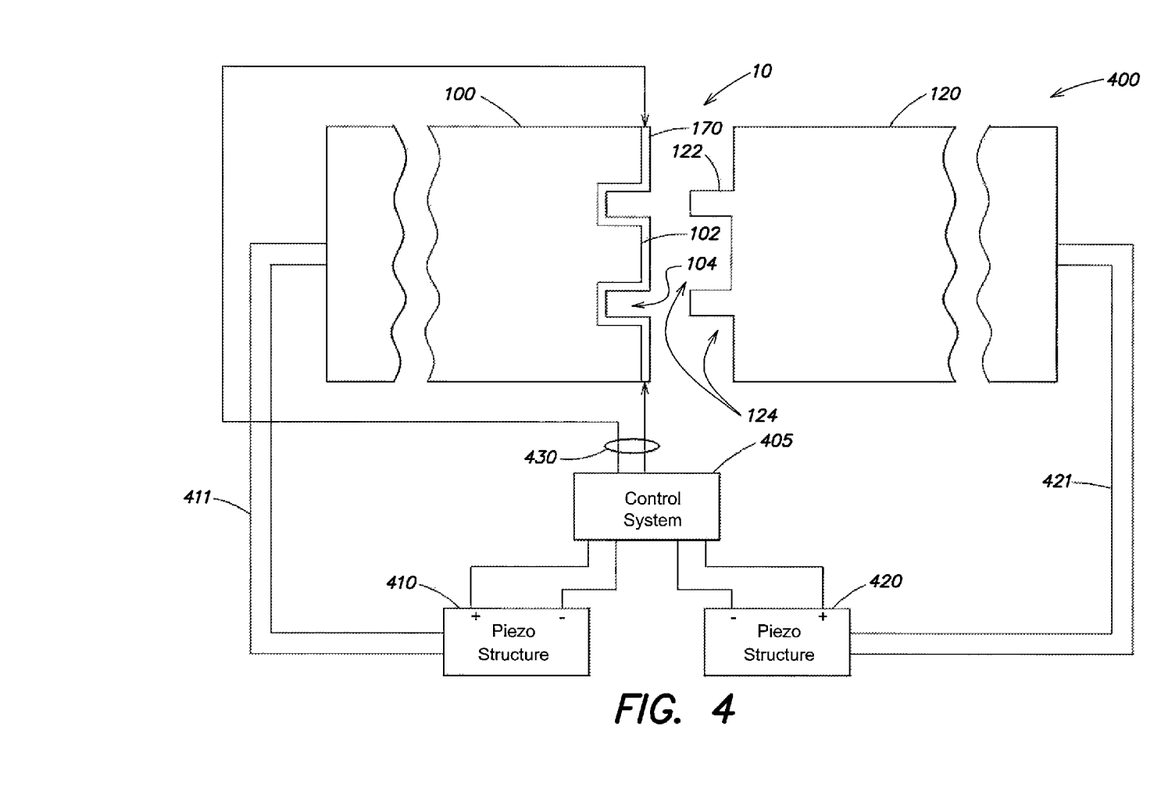
FIG. 4 is a block diagram of example apparatus configured to adjust a distance between the fingers.

FIG. 4 is a block diagram of one possible embodiment of an apparatus 400 to control the capacitance of the interdigitated capacitor structure 10. The capacitive structure 10 is shown coupled to a control system 405, and a pair of piezoelectric structures 410, 420. The capacitor 10, as has been explained above, includes a first terminal 100, second terminal 120, their associated fingers 102, 122, spaces 104, 124 between fingers, and dielectric layer 170. The block diagram view of FIG. 4 shows the dielectric layer 170 enlarged from what would be its actual size.

In this particular embodiment the spacing between fingers 100, 120 is controlled by one or more piezoelectric actuators 410, 420. One the piezo structures is mechanically coupled to a respective one of the terminals 100, 122 to effect relative movement via linkages 411, 421. The control system 405 thus produces one or more voltages to control state of the piezoelectric actuators 410, 420.

In one arrangement the control system 405 also produces one or more other voltages 430 which are arranged to set a voltage bias on the dielectric layer 170. In this embodiment the dielectric layer 170 may be formed of a ferroelectric thin film material such as barium strontium titanate (BST). These materials exhibit a different dielectric constant depending upon a voltage to which they are exposed.

It should be understood that the control system 405 may operate with the piezoelectric structures 410 and/or 420 and with the variable dielectric 170 individually, or using both adjustment modalities in combination. When both modalities are used, it may for example be advantageous to use the piezoelectric or other mechanical distance control to set a coarse value for the capacitance of structure 10, and then set a finer grained control over capacitance by adjusting the voltage on dielectric layer 170.

Figure 5:
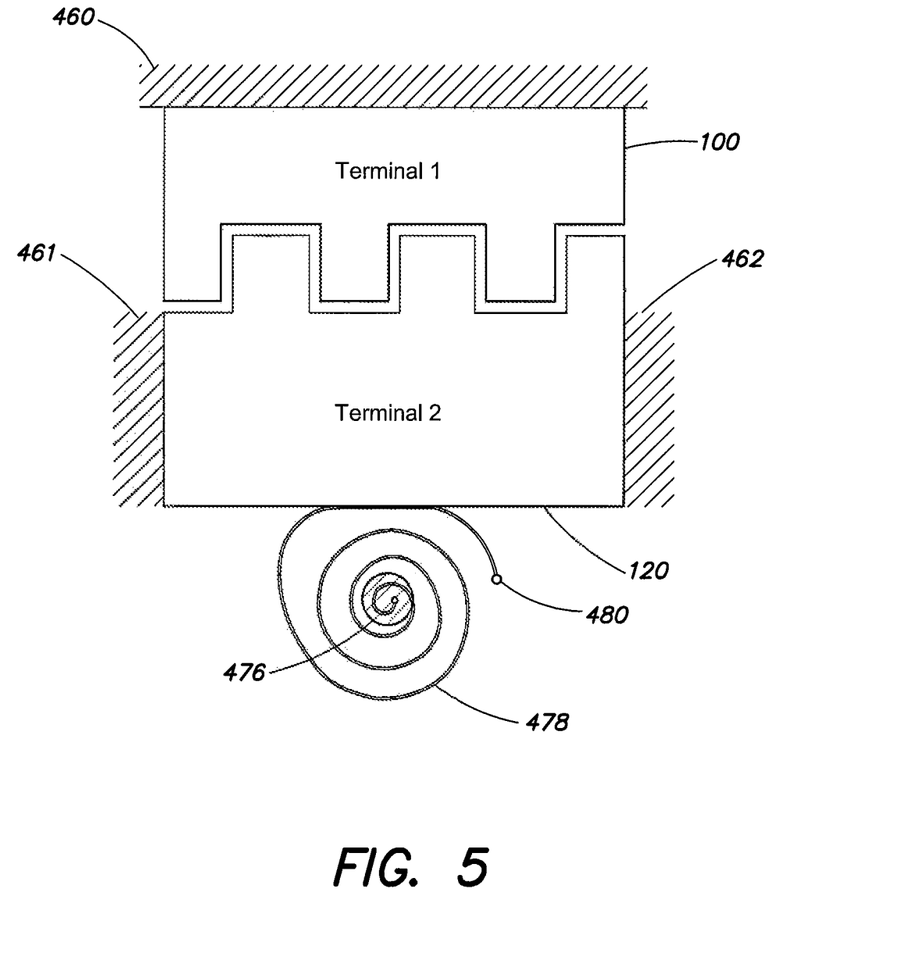
FIG. 5 is a similar apparatus using a motor and spring.

In another arrangement, shown in FIG. 5, the first terminal 100 is fixed to a base 460, and the second terminal 120 is movable along an axis between two guided walls 461, 462. A piezoelectric controlled motor 476 controls tension on a spring 478 fixed to point 480. Thus, when the motor 476 is activated to tighten the spring 478, the distance between terminal 100 and 120 is increased; when the spring 478 is loosened, the distance between terminals 100 and 120 decreases.

Figure 6:
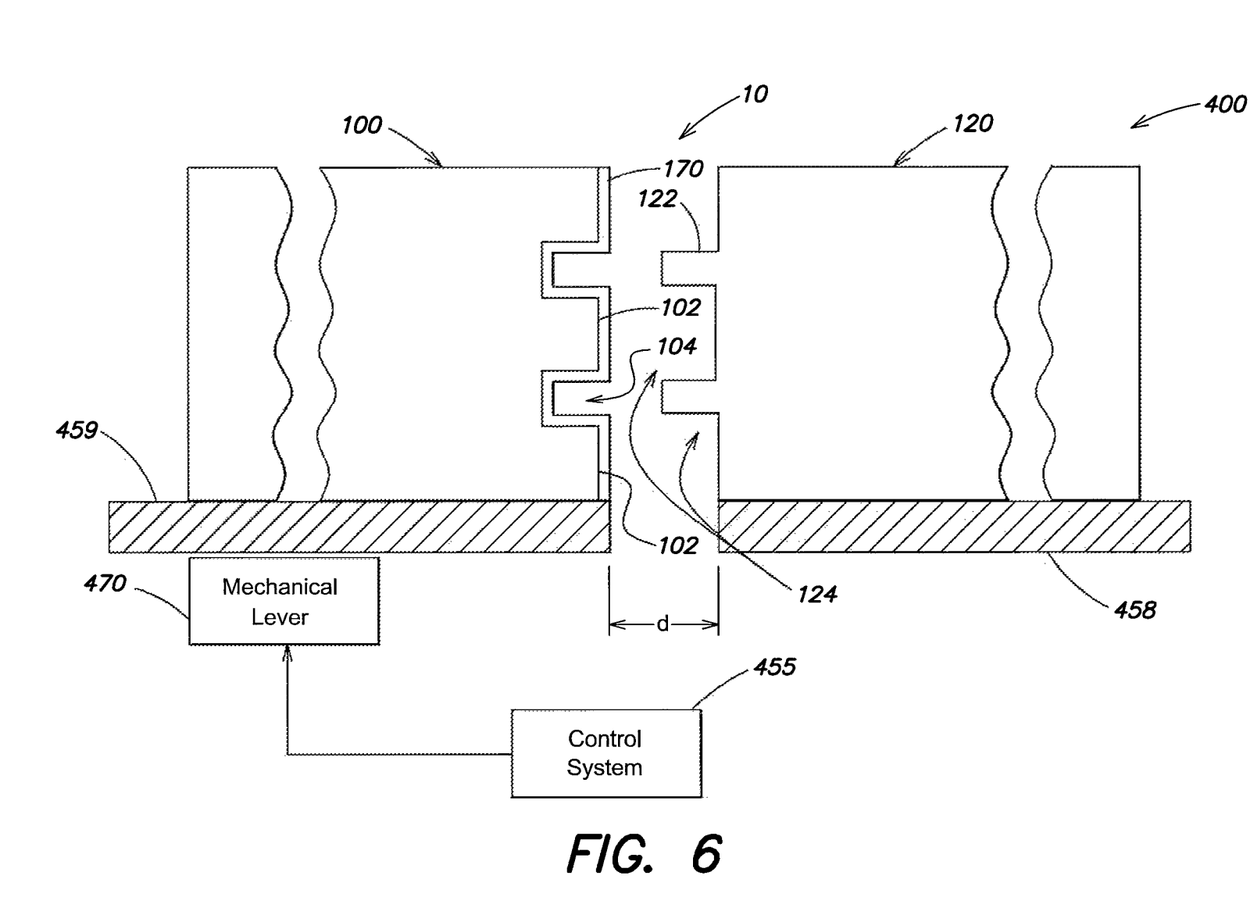
FIG. 6 is a block diagram of an example apparatus configured to adjust a dielectric constant of an insulating layer.

FIG. 6 is another apparatus 400 that uses mechanical motion to effect a change in distance between the first terminal 100 and the second terminal 120. Here the second terminal 120 is maintained in a fixed location with respect to a substrate 458 and first terminal 100 is mounted to another substrate 459. Substrate 459 in turn may be displaced by mechanical device such as a lever 470. A control system 455 activates the mechanical lever providing relative movement of the first terminal 100 with respect to the second terminal 120.

Figure 7:
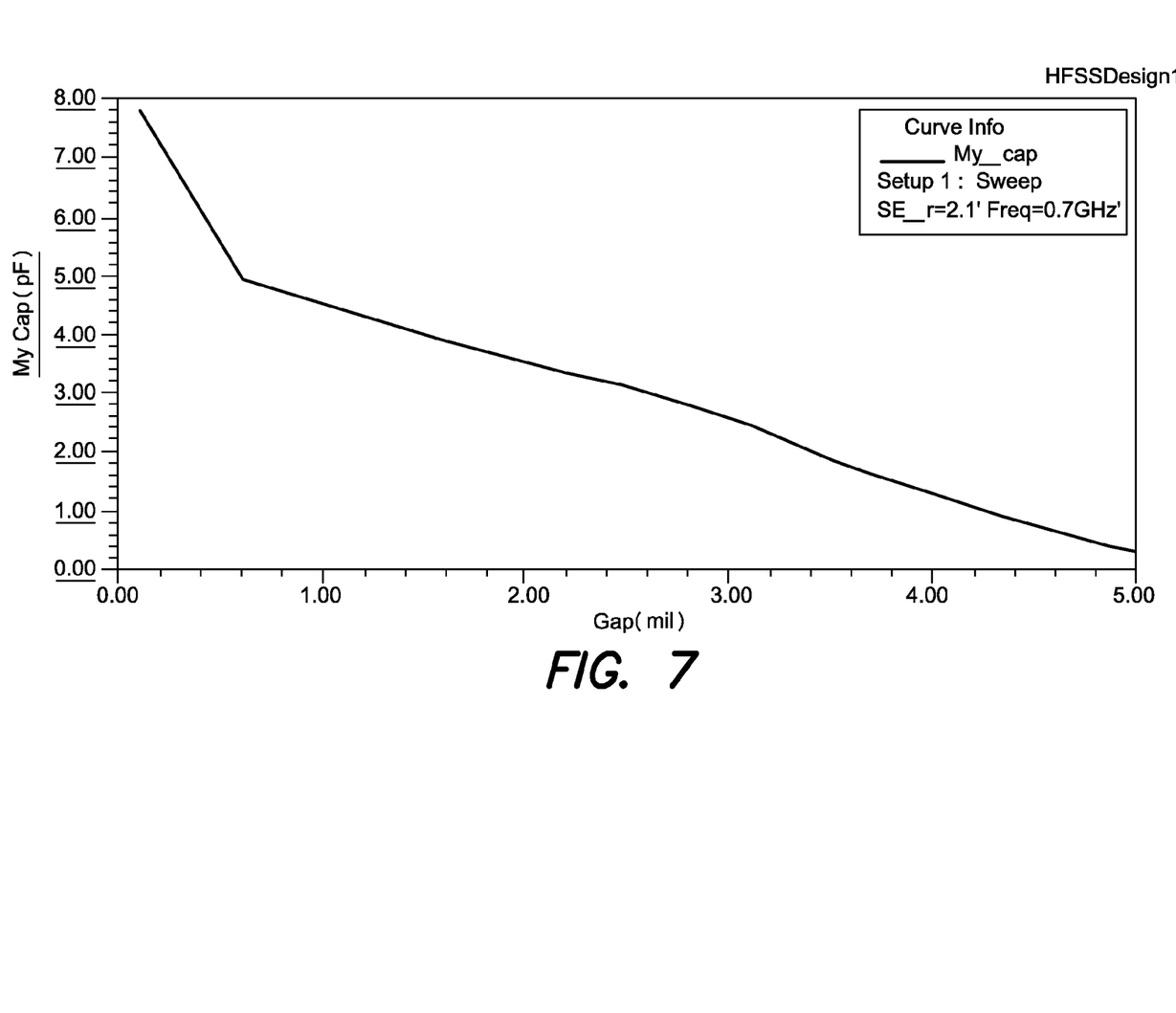
FIG. 7 illustrates capacitance versus gap size.

FIG. 7 is a diagram showing relative capacitance value in picofarads as a function of the gap size for a capacitor structure 10 constructed in accordance with the embodiments of FIGS. 2 and 3. The plot was taken with a dielectric constant of the material layer set at 2.1 and was measured at a frequency of 0.7 GHz. The total capacitance is seen to decrease as the size of the gap increases.

Figure 8:
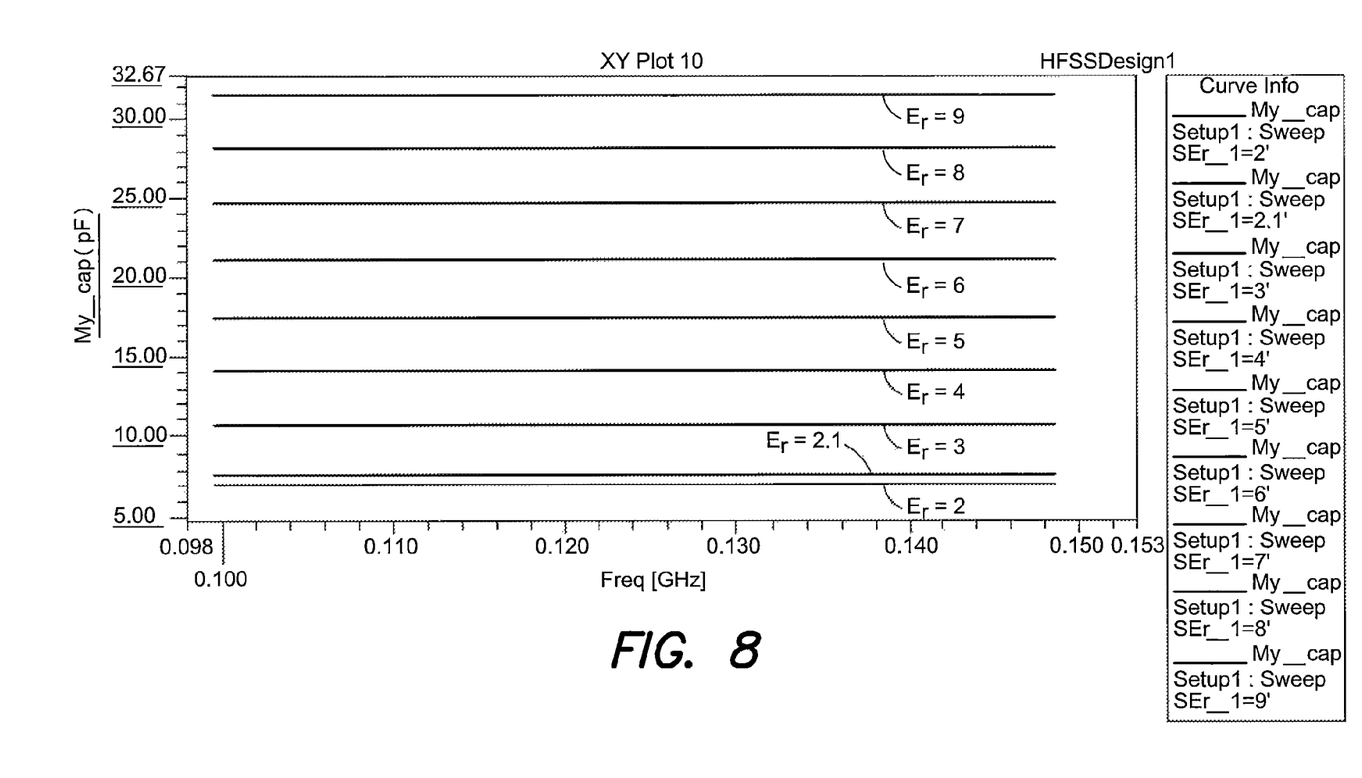
FIG. 8 illustrates the effect of dielectric constant, $\in_r$, on the capacitance.

FIG. 8 is a plot of capacitance versus different values for the dielectric material used as an insulating layer 170. The measurements were taken with the two terminals completely closed, such that only the insulating material layer of 0.1 mils remained between the fingers. Capacitance values between approximately 7 pF and 31 pF are seen to be achievable.

Figure 9:
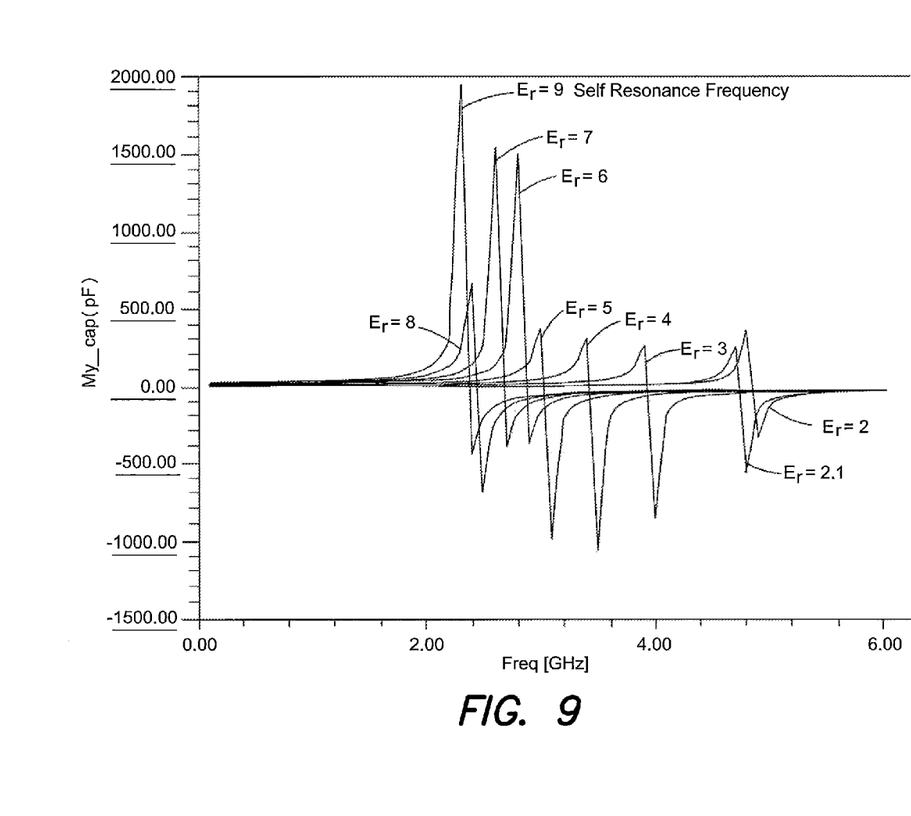
FIG. 9 is an example self-resonant frequency response for various values of $\in_r$.

FIG. 9 is a plot of self resonant frequency in gigahertz versus dielectric constant for the insulating layer 170. The same range of values for the dielectric constant were also used in determining these plots.

Figure 10:
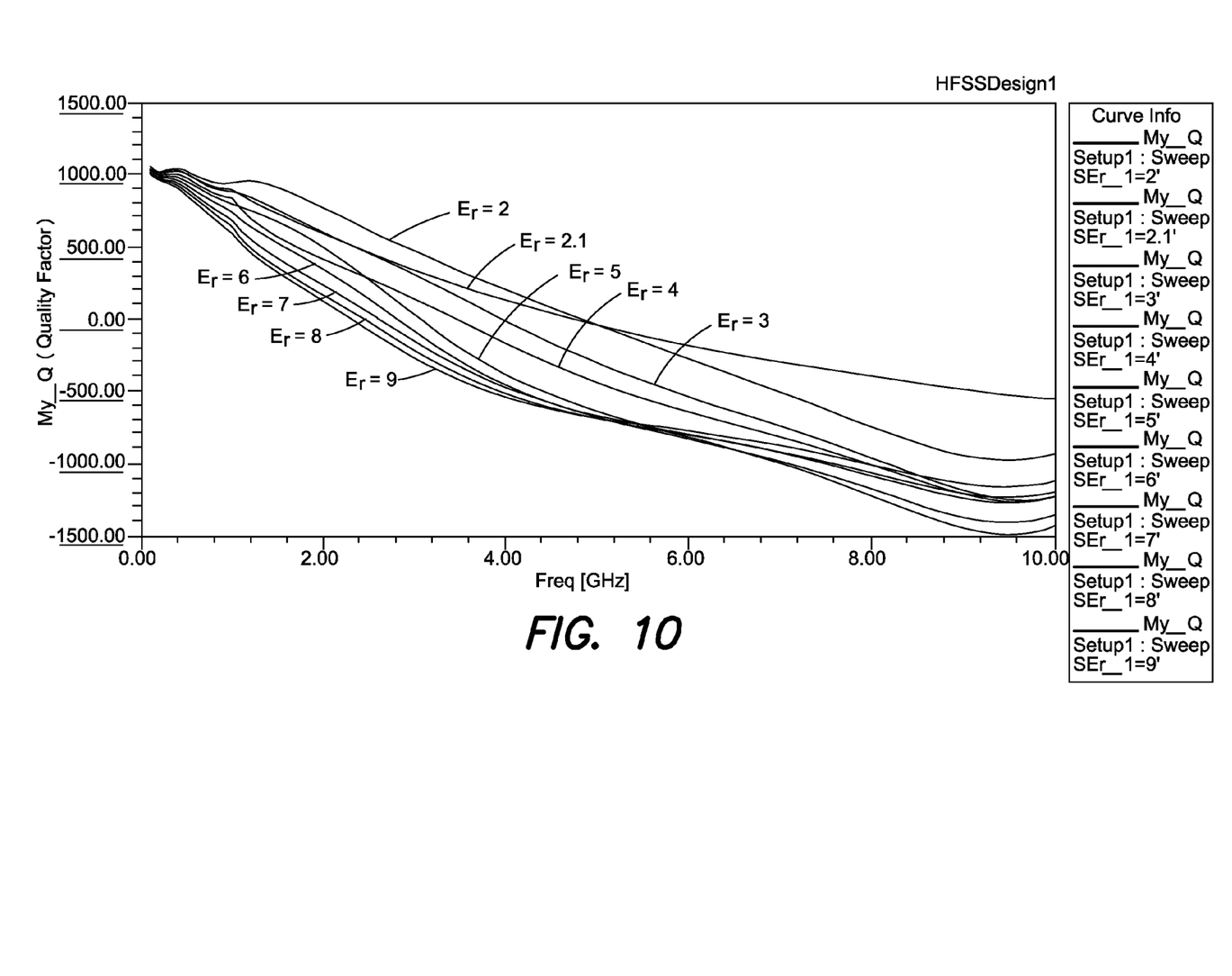
FIG. 10 is a plot of quality factor versus $\in_r$.

FIG. 10 illustrates dependence of quality factor on dielectric constant.

Figure 11A:
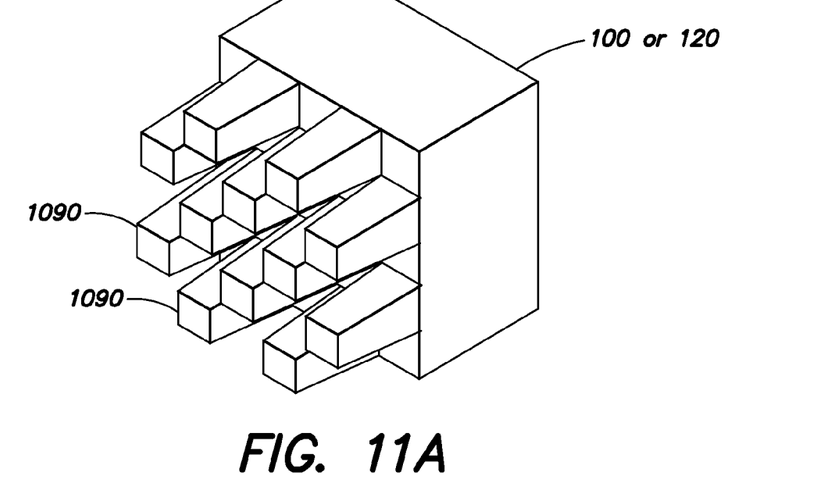
FIGS. 11A, 11B and 11C are another embodiment with trapezoidal tapered fingers.
Figure 11B:
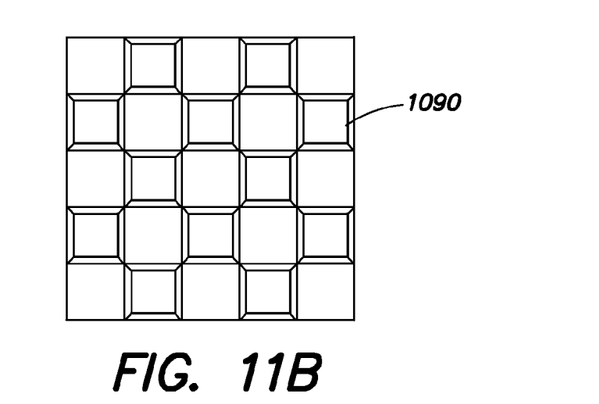
Figure 11C:
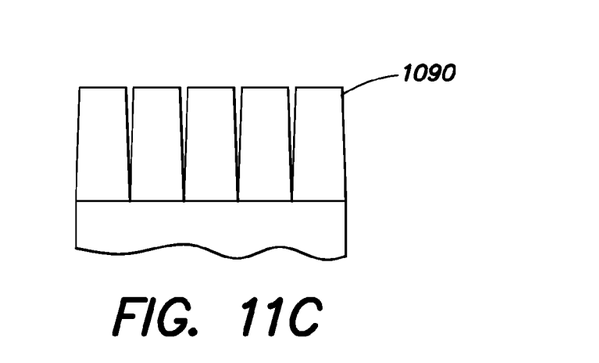

FIGS. 11A, 11B and 11C are isometric, front, and side views of an alternate arrangement for the finger arrays 100, 120. Here the individual fingers 1090 have a generally trapezoidal shape such that they taper in cross section with distance from the respective main body portion. Other embodiments may use fingers with other defined shapes, such as cylinders, so long as the fingers of the two terminals may be interposed between one another.

It is therefore seen that a relatively high quality factor can be achieved in a relatively small space with the adjustable interdigitated structures described herein.

Figure 12A:
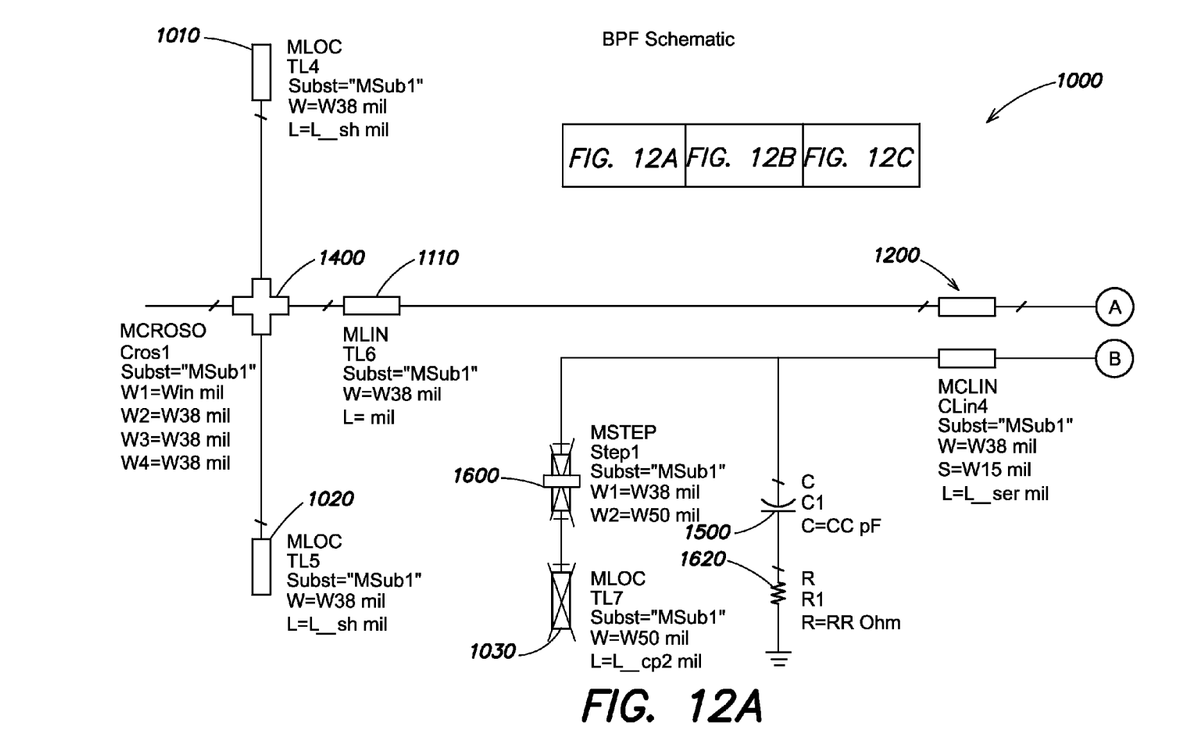
FIGS. 12A, 12B and 12C are an example circuit diagram for a bandpass filter using the interdigitated capacitor as a shunt capacitor.
Figure 12B:
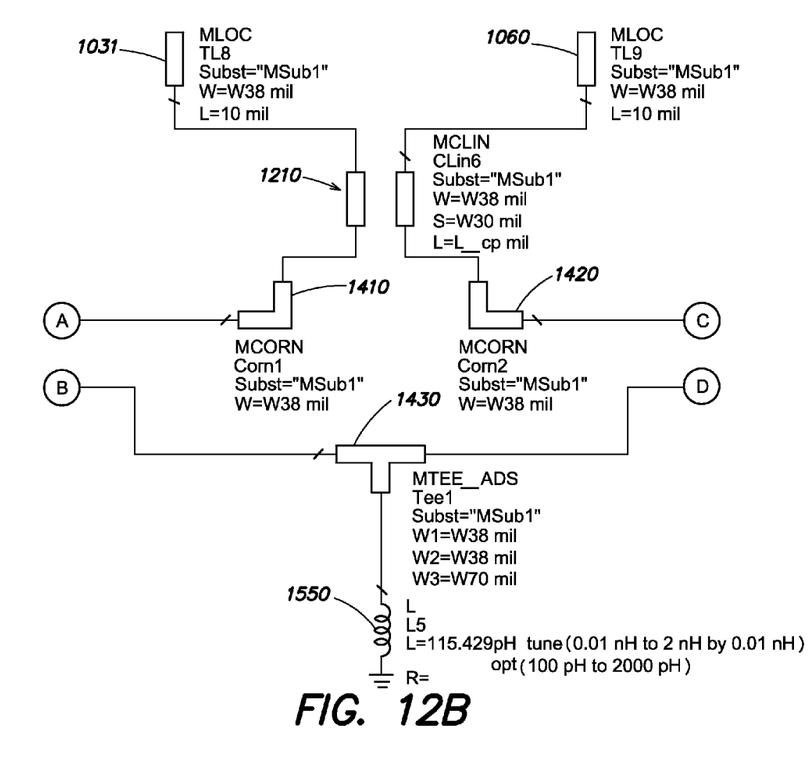
Figure 12C:
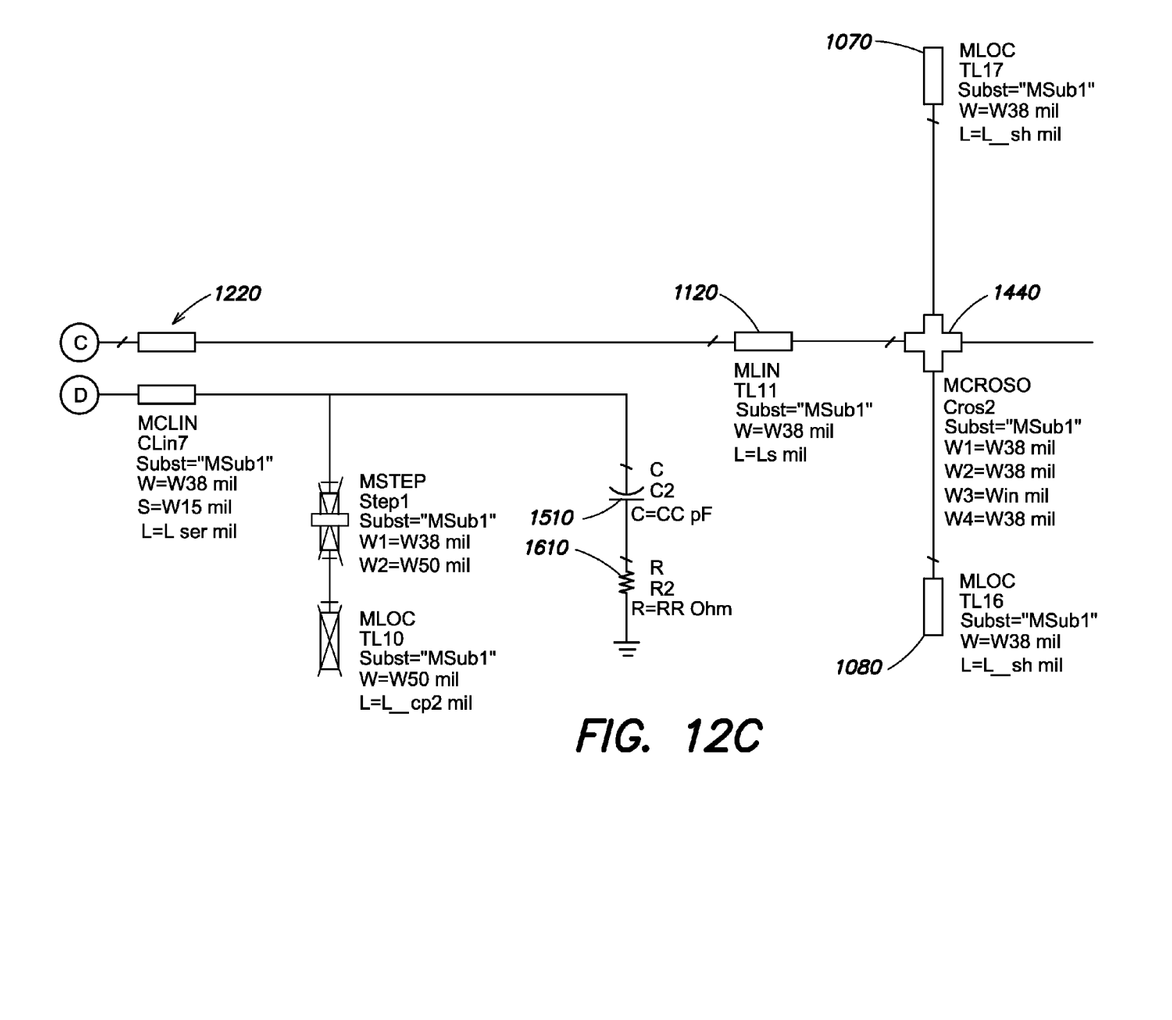

FIGS. 12A, 12B and 12 C shows a circuit diagram of one possible implementation of a bandpass filter (BPF) 1000 that uses the interdigitated capacitor 10 as a shunt element. Filter 1000 makes use of lumped elements implemented as transmission line sections. For example, transmission line sections 1010, 1020, 1030, 1031, 1060, 1070 and 1080 implements capacitors; and transmission line sections 1110, 1120 implement inductors. Transmission line sections 1200, 1210 and 1220 also may be used to implement each coupler. Also shown are other sections of transmission line such as corner sections 1410, 1420, T section 1430, and junctions 1400, 1440 providing interconnections between the different components of the bandpass filter 1000.

In addition, discrete shunt capacitors 1500, 1510 are implemented using the interdigitated structure(s) as described above. The filter 1000 may also include other discrete components such as resistors 1600, 1610 and/or inductors 1550 to complete the filter design.

More details of this type of transmission line based filter are available in the co-pending U.S. patent application referenced above, Ser. No. 14/218,281 filed Mar. 18, 2014 entitled "Tunable Filter Using Variable Impedance Transmission Lines".

While various embodiments of the invention have now been particularly shown in the drawings and described in the text above, it will be understood by those skilled in the art that various changes in form and details may be made therein without departing from the scope of the invention. It is intended, therefore, that the invention be limited only by the claims that follow.

What is claimed is:

1. A variable capacitor apparatus comprising:
   a first terminal section comprising a first main body portion with a first set of two or more fingers extending from the first main body;
   a second terminal section comprising a second main body portion with a second set of two or more fingers extending from the second main body;
   the fingers of the first and second terminal sections each arranged in a respective array including at least two rows and at least two columns and;
   a support, for supporting the first terminal section and second terminal section in a position with respect to one another such that at least some of the first set of fingers and at least some of the fingers of the second set of fingers are interposed between one another and for maintaining a space between the fingers of the respective first and second set of fingers; and
   a controller, arranged to control a distance between the first and second set of fingers, and to thereby effect a change in capacitance of the apparatus.

2. The apparatus of claim 1 wherein the first and second body portions are aligned with respect to one another to provide uniform spacing between vertical and lateral side surfaces of the fingers extending from the respective first and second body portions.

3. The apparatus of claim 1 wherein the controller additionally effects a change in capacitance by moving the first and second terminal sections with respect to one another.

4. The apparatus of claim 1 additionally comprising:
   a dielectric layer disposed on at least one of the first and second set of fingers.

5. The apparatus of claim 4 wherein the controller effects a change in capacitance by changing a dielectric constant of the dielectric layer.

6. The apparatus of claim 5 wherein the dielectric layer is formed of a voltage sensitive material and the controller changes a voltage applied to the dielectric layer.

7. The apparatus of claim 6 wherein the dielectric layer is formed of barium strontium titanate.

8. The apparatus of claim 3 additionally comprising:
   a piezoelectric actuator, coupled to the controller, to further effect movement between the first and second terminal sections.

9. The apparatus of claim 3 additionally comprising:
   a lever, coupled to one of the first and second terminal sections and to the controller, and wherein the controller controls a position of the lever.

10. The apparatus of claim 4 wherein the controller additionally:

effects a coarse adjustment to the capacitance by moving one of the first and second terminal sections with respect to one another; and effects a fine adjustment to the capacitance by adjusting a voltage applied to the dielectric layer.

11. The apparatus of claim 1 wherein the fingers are rectangular, trapezoidal, or some other defined shape.

12. The apparatus of claim 1 further implemented as part of a tunable filter apparatus, the tunable filter apparatus further comprising:

at least one other capacitive element including a first transmission line section disposed adjacent a first dielectric material section having a dielectric constant;

at least one other inductive element including a second transmission line section disposed adjacent a second dielectric material section having a dielectric constant; and the variable capacitor apparatus providing at least one shunt variable capacitive element.

13. The apparatus of claim 1 wherein the variable capacitor is disposed as a shunt capacitor in a transmission-line filter circuit.

* * * * *